United States Patent

King

[15] 3,695,228

[45] Oct. 3, 1972

[54] VULCANIZING RUBBER COVERED WIRE

[72] Inventor: Herbert R. King, Spartanburg, S.C. 29303

[73] Assignee: Deering Milliken Research Corporation, Spartanburg, S.C.

[22] Filed: June 15, 1970

[21] Appl. No.: 46,416

[52] U.S. Cl. ..................................118/620, 118/405
[51] Int. Cl. ................................................B05c 5/00
[58] Field of Search...............118/620, 405, DIG. 18, DIG. 22; 156/500, 117, 397; 277/110, 115

[56] References Cited

UNITED STATES PATENTS

| | | | |
|---|---|---|---|
| 2,364,526 | 12/1944 | Hansell | 118/620 X |
| 2,360,097 | 10/1944 | Balthis et al. | 118/620 X |
| 2,357,079 | 8/1944 | Brown | 118/DIG. 18 |
| 2,956,308 | 12/1960 | Holdren | 277/110 X |
| 2,386,148 | 10/1945 | Smith | 118/DIG. 18 |
| 2,576,961 | 12/1951 | McCarthy | 118/DIG. 18 |
| 2,320,801 | 6/1943 | Simons | 118/DIG. 18 |
| 1,943,818 | 1/1934 | Pantone et al. | 118/DIG. 18 |
| 870,615 | 11/1907 | Brazelle | 277/110 |
| 2,078,465 | 4/1937 | Smith | 277/110 |

Primary Examiner—James Kee Chi
Attorney—Norman C. Armitage and H. William Petry

[57] ABSTRACT

Apparatus including a supply source of metal wire cord, an extruder for applying a coating to the cord, a pressure chamber including a high frequency induction heating source, an adjustable seal assembly for the outlet of the chamber, means for withdrawing coated cord from the pressure chamber through the seal assembly, and means for collecting the coated cord in a desired configuration.

2 Claims, 3 Drawing Figures

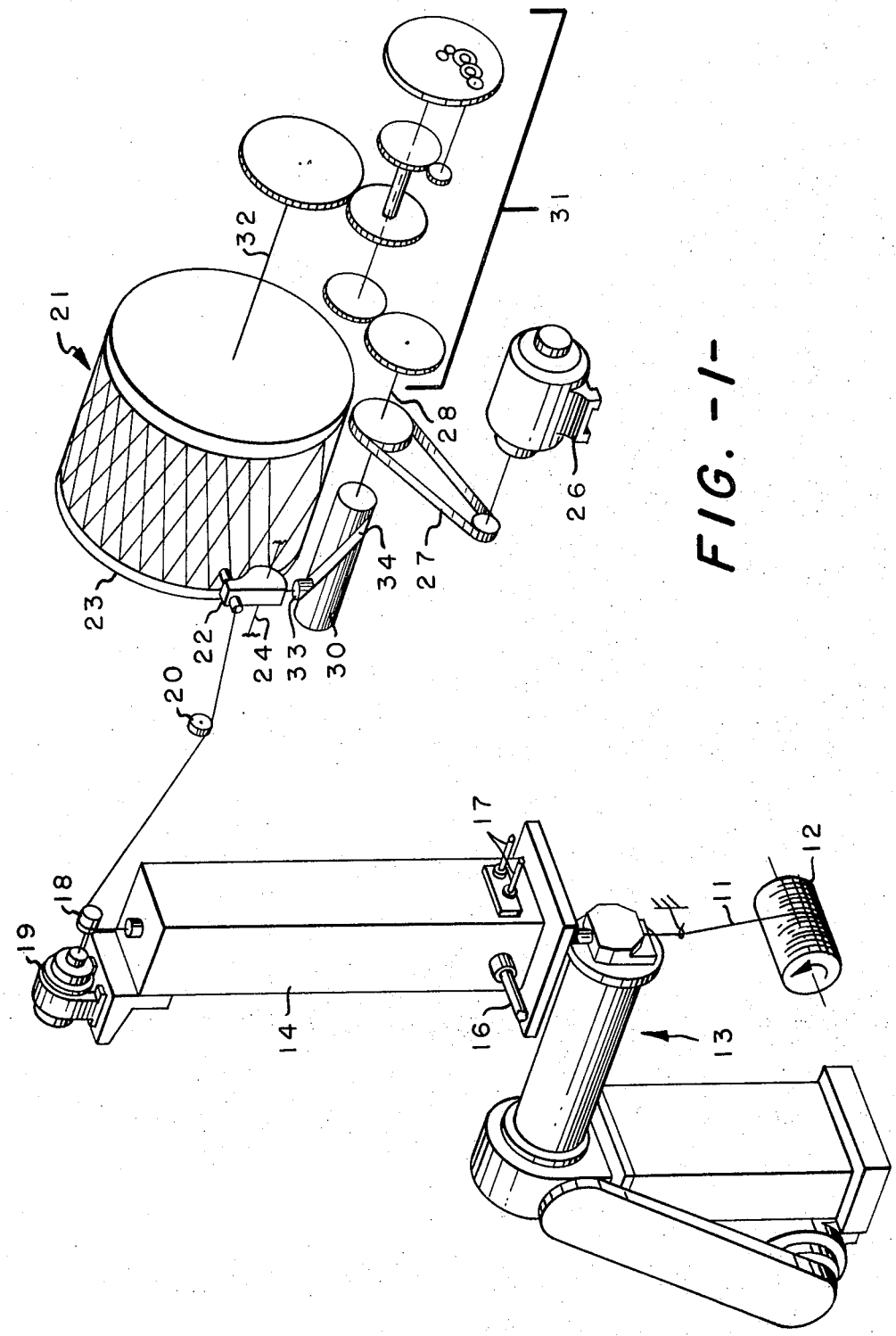
FIG. -1-
INVENTOR.
HERBERT R. KING
BY
ATTORNEY

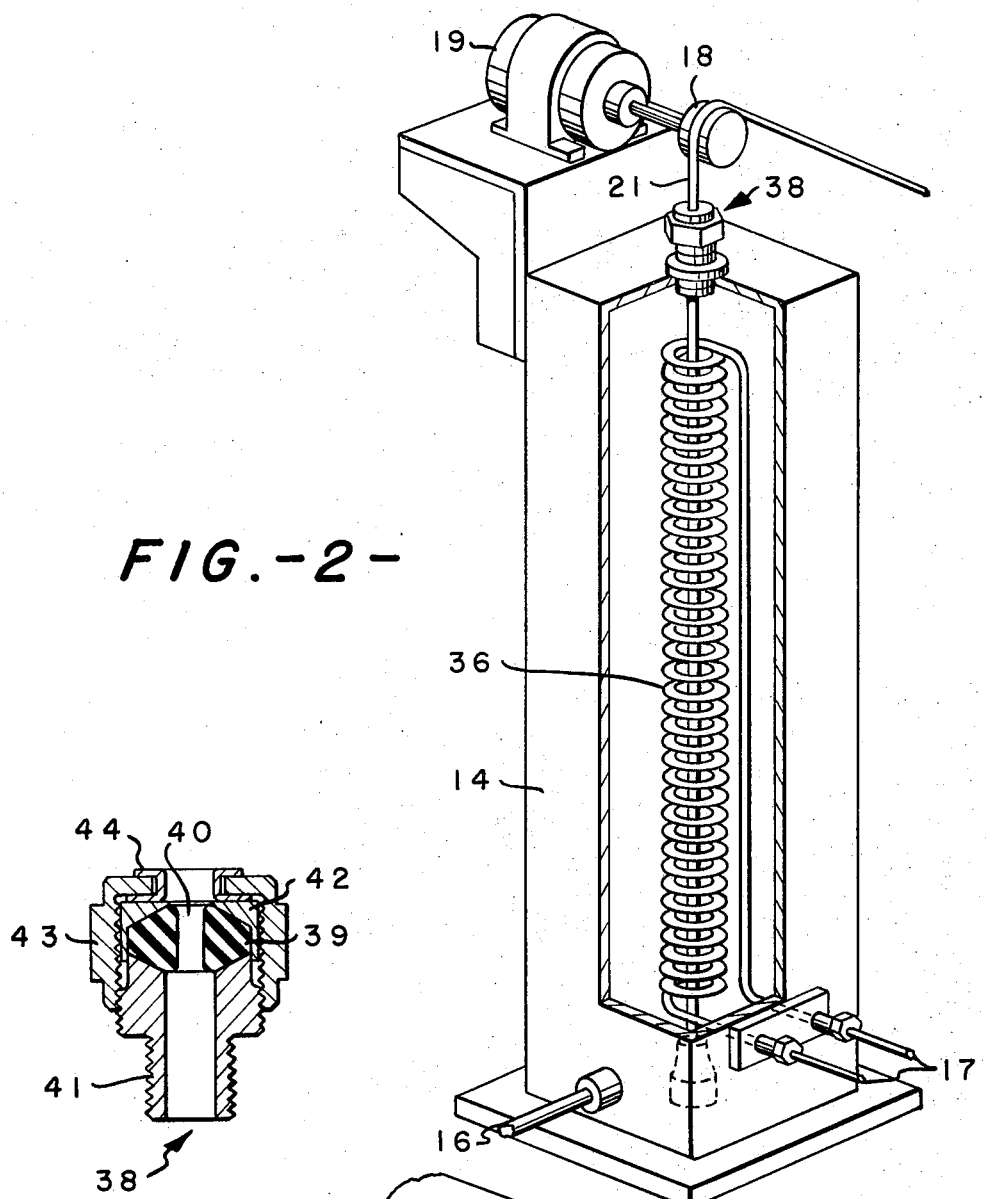
FIG.-2-
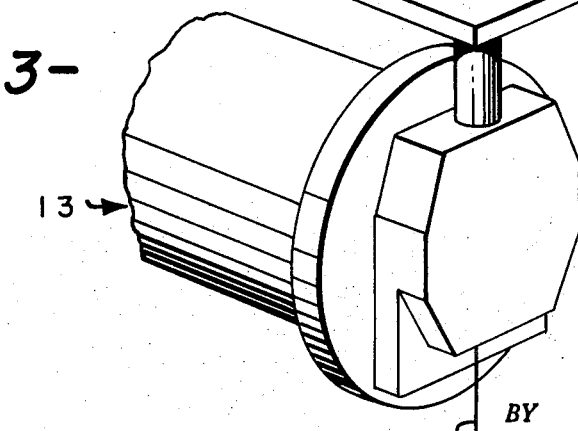
FIG.-3-
INVENTOR.
HERBERT R. KING
BY
ATTORNEY

VULCANIZING RUBBER COVERED WIRE

This invention relates to the vulcanization of rubber coatings on wire and more particularly relates to the vulcanization of such rubber coatings while retaining the tackiness of the outer surface.

The tire industry recently has developed considerably interest in tire constructions which include an annular reinforcement belt or breaker strip about the periphery of the tire between the tread and the carcass. Such belted tires have the advantage of better road stability and longer tread life both in radial and bias ply constructions.

It has been proposed to form tire reinforcement belts by winding one or more continuous lengths of cord onto a rotating drum while employing a reciprocating guide to traverse the drum surface and to lay the cord in a generally zigzag pattern thereon. Examples of such belts are disclosed in U. S. Pat. Nos. 2,982,327 and 3,422,874. Prior to the placement of the cord on the drum surface, the cord may be coated with unvulcanized rubber. This coating which is quite tacky facilitates adhesion of the cord to the drum, adhesion between adjacent cord and also between the cord and the tread and carcass portions of the tire.

When wire cord is used in the formation of tire belts, a number of problems are encountered which are not present when other cord materials are employed. The stiffness of the wire increases the possibility of adjacent cords cutting through the intermediate rubber coating so that the wire cords contact each other and cause damage or breakage resulting in premature failure of the tire. This is a problem particularly at the points in the belt where the wires cross each other.

The present invention provides a novel apparatus for vulcanizing rubber on wire cord. Moreover, the invention provides a new adjustable seal assembly for a vulcanizing chamber.

The apparatus of the invention includes a supply source of metal wire cord, an extruder for applying a coating to the cord, a pressure chamber including a high frequency induction heating source, an adjustable seal assembly for the outlet of the chamber, means for withdrawings coated cord from the pressure chamber through the seal assembly and means for collecting the coated cord in a desired configuration.

The invention also includes an adjustable seal assembly for a pressure chamber, which assembly has a first member with a conically tapered surface and a second member in contact therewith and adjustable with respect thereto. The first and second members form a chamber in which is disposed a compressible rubber sealing member. Openings are located through the first, second and sealing members to provide a passage through the assembly. Preferably, the rubber sealing member is formed of silicone rubber.

The apparatus of the present invention is useful for producing continuous metal wire cord having a rubber coating thereon with a high degree of vulcanization adjacent the cord and a low degree of vulcanization at the outer surface of the coating.

Preferably, the induction heating of the rubber coated wire cord is accomplished at a super atmospheric pressure to minimize the possibility of vaporization adjacent the interface of the rubber and the wire. The super atmospheric pressure employed is desirably between about 20 and 400 pounds per square inch gauge pressure.

The high frequency heating may be accomplished using known sources of high frequency energy. The heating of the moving coated cord under a super atmospheric pressure requires that the heating be done in a chamber with a suitable seal arrangement to maintain the pressure level in the chamber without excessive fluid flow rates while at the same time facilitating passage of the coated cord without damage.

The invention will be illustrated further with reference to the accompanying drawings, in which:

FIG. 1 is a schematic view in perspective of one form of apparatus of the invention;

FIG. 2 is an enlarged fragmentary view partially in section of part of the apparatus shown in FIG. 1; and FIG. 3 is a further enlarged sectional view of the outlet portion of the heating chamber shown in FIG. 2.

As shown in FIG. 1, an extruder 13 has associated therewith a pressure chamber 14 having a fluid inlet 16 for a pressure fluid such as compressed air and induction heating connections 17. A pulley 18 which is driven by motor 19 is disposed at the outlet of chamber 14. A winding apparatus 21 for forming an endless reinforcement includes a rotatable winding drum 23 and a guide 22 which is mounted for movement on rod 24. Drum 23 and the cord guide 22 are driven by a power source shown as motor 26. Motor 26 is drivingly connected through a belt and pulley arrangement 27 to a rotatable shaft 28. One end of shaft 28 is associated with barrel cam 30 and the opposite end through a suitable gear train 31 to shaft 32 for drum 23. A cam follower 33 connected to the cord guide 22 engages a groove 34 in the surface of cam 30. Groove 34 is of such a configuration that during rotation of the winding drum 23, cord guide 22 reciprocates on rod 24 across drum surface transversely to the direction of rotation.

As shown in greater detail in FIG. 2, pressure chamber 14 has an induction heating coil 36 disposed therein. The outlet 38 of the chamber (FIG. 3) includes a compressible rubber ring seal 39 with a central opening 40 and surfaces tapered toward the periphery thereof. The tapered surfaces engage corresponding tapered surfaces in threaded male fitting 41 and cup 42. Cup 42 is pressed against seal 39 by threaded female fitting 43. A thrust washer fitting 44 is disposed between cup 42 and fitting 43 to prevent rotation of cup 42 as the fitting 43 is rotated. As the fitting 43 is moved toward fitting 41 the seal 39 is compressed therebetween. This compression of the seal causes the opening 40 therein to decrease in size. Correspondingly, if the fitting 43 is moved away from fitting 41 by reverse rotation, the pressure on seal 39, by cup 42 will be reduced, and the seal will expand so that the opening 40 therein increases in size. In this way, the size of the opening 40 can be adjusted to provide a proper seal around the coated cord. Proper sealing is important to maintain the pressure within the chamber 14 with a minimum flow of pressure fluid through inlet 16.

In the operation of the apparatus illustrated in the drawings, metal wire cord 11 from a supply package 12 is drawn through extruder 13 and pressure chamber 14 by pulley 18 driven by motor 19. Within the chamber, the cord moves through induction heating coil 36. The coated cord then passes over guide roller 20 to traversing guide 22 which positions the cord on rotating drum 23. Since the guide 22 reciprocates on rod 24 transversely of the rotation of the drum, the cord is laid in a zigzag pattern over the surface of the drum. Gear train 31 includes a combination of gears to control the position of the cord on the drum during each rotation of the drum so that the cord is laid on the surface in a predetermined position with respect to previously positioned cord lengths. The winding operation is continued until a complete reinforcement is produced, that is, the cord spacing and configuration is substantially uniform throughout and is in accordance with the preselected pattern.

The above description and drawings show that the present invention provides a novel apparatus for providing a rubber coating on continuous metal wire cord, which coating has a high degree of vulcanization adjacent the wire surface and a low degree of vulcanization at the outer surface of the cord. Moreover, the invention provides novel apparatus for vulcanizing a running rubber coated metal wire cord. Also, the invention includes a novel adjustable seal construction which provides for the adjustment of the seal while a running rubber coated metal wire cord is passing therethrough.

It will be apparent that various modifications and variations may be made in the method and apparatus described in detail and shown in the drawings within the scope of the invention. For example, the heating chamber may be of a different design. Also, the means for transferring the cord from the heater and positioning it on the drum surface may employ other structural elements. Therefore, the invention is to be limited only by the following claims.

That which is claimed is:

1. Apparatus including a supply source of metal wire cord, an extruder for applying an unvulcanized rubber coating to said cord, a pressure chamber connected directly to said extruder, a high energy induction heating coil disposed within said pressure chamber concentrically of wire cord passing therethrough, an adjustable seal assembly forming the outlet of said chamber, means for maintaining a pressure within said chamber between about 20 and 400 pounds per square inch gauge pressure, means for advancing said coated cord through said induction heating coil and from said pressure chamber through said seal assembly, means for advancing said coated cord to a rotatable drum and guide means operably connected with said rotatable drum for positioning said coated cord on said drum in a zigzag pattern with reversals at the edges; said seal assembly including a compressible rubber sealing member with surfaces tapering to the periphery thereof, a first member having a surface with a conical taper matching the mating surface of the sealing member, a second member of a cup configuration in contact with said first member and being disposed over said sealing member and in contact with another tapered surface thereof, openings through said first, second and sealing members to provide a passage through said assembly, and means for adjusting the position of said second member with respect to said first member to vary the compressive forces on said sealing member and thereby change the size of the opening therethrough.

2. Apparatus according to claim 1 wherein the rubber sealing member is silicone rubber.

* * * * *